United States Patent [19]

Audouin et al.

[11] Patent Number: 5,612,808
[45] Date of Patent: Mar. 18, 1997

[54] SYSTEM AND A METHOD FOR PERFORMING SOLITON TRANSMISSION

[75] Inventors: Olivier Audouin, Savigny sur Orge; Jean-Pierre Hamaide, Saint Germain les Arpajon, both of France

[73] Assignee: Alcatel N.V., Amsterdam, Netherlands

[21] Appl. No.: 607,554

[22] Filed: Feb. 27, 1996

Related U.S. Application Data

[63] Continuation of Ser. No. 186,141, Jan. 25, 1994, abandoned.

[30] Foreign Application Priority Data

Jan. 28, 1993 [FR] France .................. 93 00856

[51] Int. Cl.$^6$ ............................ H04B 10/00; H04B 10/16
[52] U.S. Cl. ........................ 359/161; 359/173; 359/179; 385/123
[58] Field of Search ........................ 359/333, 341

[56] References Cited

U.S. PATENT DOCUMENTS

| | | | |
|---|---|---|---|
| 4,261,639 | 4/1981 | Kogelnik et al. | 350/96.15 |
| 4,969,710 | 11/1990 | Tick et al. | 350/96.3 |
| 5,035,481 | 7/1991 | Mollenauer | 359/124 |
| 5,140,656 | 8/1992 | Hasegawa et al. | 359/173 |
| 5,355,240 | 10/1994 | Prigent et al. | 359/161 |
| 5,357,364 | 10/1994 | Gordon et al. | 359/173 |
| 5,361,319 | 11/1994 | Antos et al. | 385/123 |

OTHER PUBLICATIONS

Japanese Patent Abstract JP 4335619 dated Nov. 24, 1992.
Japanese Patent Abstract JP 2096120 dated Apr. 6, 1990.
S.V. Chernikov et al "70 Gbit/s fibre based source of Fundamental solitons at 1550 nm", *Electronics Letters*, vol. 28, No. 13, Jun. 18, 1992, pp. 1210–1212.
Mecozzi et al., "Soliton Transmission Control", *Optics Letters*, vol. 16, No. 23, Dec. 1, 1991, pp. 1841–1843.

*Primary Examiner*—Leo Boudreau
*Assistant Examiner*—Bhavesh Mehta
*Attorney, Agent, or Firm*—Sughrue, Mion, Zinn, Macpeak & Seas

[57] ABSTRACT

Light pulses carrying data in binary form to be transmitted are injected into a transoceanic line fiber in which they pass through amplifiers imparting Gordon-Haus jitter to them. In accordance with the invention, a compensation fiber is disposed at the output of the line fiber so as to apply negative chromatic dispersion to the pulses so as to compensate their jitter in part before they are processed in a receiver. The invention applies to telecommunications.

6 Claims, 2 Drawing Sheets

SYSTEM AND A METHOD FOR PERFORMING SOLITON TRANSMISSION

This is a continuation of application Ser. No. 08/186,141 filed Jan. 25, 1994, now abandoned.

FIELD OF THE INVENTION

The present invention relates to transmitting data over an optical fiber in the form of light pulses. It is known that, in such a fiber, by compensating two types of effect, it is possible for suitably-shaped short pulses, referred to as "solitons", to propagate without being deformed. One of the types of effect is constituted by a dispersive effect creating chromatic dispersion which affects the group propagation speeds of such pulses. The other type is constituted by Kerr-type non-linear optical effects. Such compensation is sometimes referred to as the "soliton effect".

BACKGROUND OF THE INVENTION

To obtain the soliton effect, several conditions must be satisfied simultaneously. Firstly, the pulses must be short: e.g., for 10 Gbit/s transmission, each pulse must have a duration at half-intensity of about 20 ps. The curve showing how the intensity I of each pulse varies as a function of time t must have a shape defined by the following expression:

$$I=4I_o/(e^{t/\tau}+e^{-t/\tau})^2$$

where $I_o$ is the peak intensity and $\tau$ is a duration that is proportional to the duration of the pulse at half-height. Secondly, the pulses must be "close to the Fourier limit", i.e. the product of the duration of a pulse multiplied by its spectral width must be less than a limit of about 0.7, and must be as close as possible to an ideal limit of 0.32. Finally, the intensity of the pulses must be maintained approximately constant during propagation. As far as the fiber is concerned, a suitable ratio must be established between firstly the product of a peak intensity of a light pulse multiplied by a constant representative of the Kerr effect, and secondly the product of the square of a spectrum width of the pulse multiplied by a constant representative of the chromatic dispersion effect appearing in each unit of length of the fiber. The latter constant is a chromatic dispersion per unit length, which, when multiplied by the length of the fiber, constitutes an overall chromatic dispersion therefor, i.e. a chromatic dispersion occurring between the input and the output of the fiber. To obtain the soliton effect, both the chromatic dispersion per unit length and the overall chromatic dispersion must be positive. This is achieved if the central wavelength of the pulse is greater than a wavelength which is characteristic of the fiber and which cancels the dispersion therein.

Using the soliton effect may offer considerable advantages in high-rate transoceanic links (6,000 km–9,000 km) that use binary encoding. Given that optical fibers present losses which cause natural attenuation of pulses, such long transmission distances may be achieved by propagating solitons along fibers whose losses are compensated by optical amplifiers. Such amplifiers are typically constituted by erbium-doped fibers. The amplifiers are distributed over the length of the link to limit the variations in the optical power of the pulses so that the pulses retain their soliton properties.

However, the noise inevitably emitted by the amplifiers limits the distances and the data-rates that are accessible because such noise gives rise to a degradation in the signal-to-noise ratio and to the appearance of "time jitter" in the pulses at the input of the reception member.

Such time jitter may be referred to as "Gordon-Haus" time jitter. It results from the fact that superposing amplification noise on a soliton is equivalent to modifying the central wavelength of the soliton. The change in wavelength causes a variation in the propagation speed along the fiber because of the chromatic dispersion thereof. The random nature of the noise causes a random variation in the speeds of the various solitons, and therefore a random time displacement of the pulses on reception. Such displacement, which constitutes said time jitter, gives rise to an increase in the transmission error rate.

The following two articles on this subject may be consulted:

Gordon and Mollenauer, "Effect of fiber nonlinearities and amplifier spacing on ultra-long distance transmission", J. Light. Technol., 9, 170 (1991); and Gordon and Haus, "Random walk of coherently amplified solitons in optical fiber transmission", Optics Lett., 11, 665 (1986).

To minimize the error rate of a soliton transmission system, two opposing conditions must be simultaneously satisfied. A first condition is that the time jitter must be limited, and this would imply choosing a fiber that presents low chromatic dispersion per unit length. The second condition is that the signal-to-noise ratio must be maintained at a sufficiently high value. To achieve this, it is necessary for the pulses transmitted to have high energy. Such high energy Gives rise to large non-linear effects. Therefore, the second condition requires a line fiber to be chosen that has high chromatic dispersion per unit length, since such high chromatic dispersion per unit length is necessary for compensating the large non-linear effects, such compensation itself being necessary for obtaining the soliton effect.

Those two conditions imply choosing an optimum intermediate value for the chromatic dispersion per unit length so as to minimize the overall transmission error rate. When such an optimum value is achieved, it appears that the degradation of the signal-to-noise ratio and the time jitter both contribute considerably to obtaining the minimized overall rate.

That is why it has been proposed, in particular, to limit the time jitter. Two known methods have been proposed for that purpose. They both act at intermediate points along a very long link, i.e. distant from the transmission station and from the reception station.

A first method is disclosed in a document entitled "10 Gb/s soliton data transmission over one million kilometers", Nakazawa, Yamada, Kubota, Suziki, Elect. Letters, 27, 1270 (1991). In that method, the shape of each pulse is reconstituted from place to place so as to maintain both the soliton properties of the pulses and the time spacing between the pulses.

The second known method is described in a document entitled "Soliton Transmission Control" Mecozzi, Moores, Haus, Lai, Optics Letters, 16, 1841 (1992). It consists in performing frequency filtering on the pulses from place to place, to maintain a constant value for the central wavelength of each pulse.

Both those known methods are costly because they suffer from considerable technical difficulties: in the first method, the modulators must be synchronized, and, in the second method, the central wavelengths of the filters must be servo-controlled.

OBJECTS AND SUMMARY OF THE INVENTION

An object of the present invention is to provide a simple way of limiting the transmission error rates affecting a link using solitons, when the errors result at least in part from Gordon-Haus time jitter affecting the received pulses.

To this end, the invention provides in particular an optical soliton transmission system including a line fiber having positive chromatic dispersion and noisy amplifier means, for guiding and maintaining solitons carrying data to be transmitted, including a compensation member 14 disposed downstream from said amplifier means 3, which compensation member presents negative chromatic dispersion so as to compensate, in part, time jitter imparted to said solitons by said amplifier means 3.

The fact that the overall chromatic dispersion of the compensation member is negative means that the light pulses received by the member necessarily lose their soliton properties therein, i.e. they become deformed, and, in particular, they spread. This applies even if the member is constituted by an optical fiber presenting a Kerr effect analogous to that of the line fiber. It is known that such spreading tends to increase the transmission error rate. However, it has been found that the presence of such a compensation member of the invention can in fact reduce the error rate.

BRIEF DESCRIPTION OF THE DRAWINGS

An embodiment of the present invention is described below by way of non-limiting example and with reference to the accompanying drawings, in which.

MORE DETAILED DESCRIPTION

Figure 1:
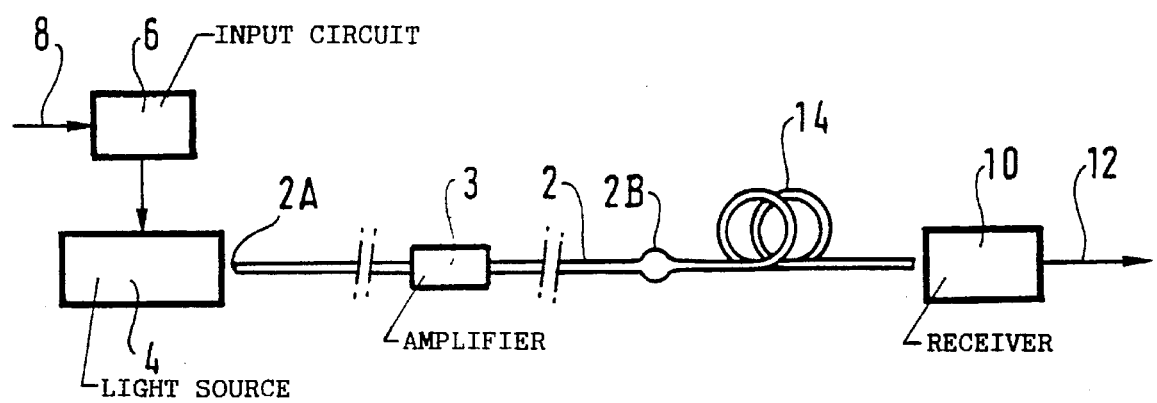
FIG. 1 is a view of a transmission system of the invention.

FIG. 1 shows a system of the invention including the following elements whose indicated functions are known:

a line fiber 2 is constituted by a very long optical fiber: the fiber has an input 2A and an output 2B and presents firstly positive chromatic dispersion DL per unit length, and secondly a Kerr effect; the dispersion and the Kerr effect compensate each other to retain the shape of a light pulse guided by the fiber when the pulse has intensity, duration, variation in shape, and spectrum width that are characteristic of a soliton of said fiber; the fiber further applies gradual natural attenuation to the light pulses guided thereby; that is why the fiber is equipped with amplifier means 3, along the length of the fiber, for applying amplification to the pulses so as to compensate the natural attenuation, at least in part; unfortunately, the amplifier means simultaneously apply interfering random spectral displacement to the pulses, which displacement, in association with said dispersive effect of the line, causes a random time displacement constituting pulse time jitter;

a light source 4 supplies transmission pulses constituting said solitons of said fiber to said input of the line fiber on command;

a system input circuit 6 receives data to be transmitted 8 and controls said light source 4 to make it supply a succession of said transmission pulses; in the succession, the time intervals between the pulses are representative of said data to be transmitted; these pulses are typically supplied only at clock instants that succeed one another at regular intervals, the data being represented in binary form by the presence or the absence of pulses at those instants;

compensation means for compensating said time jitter are provided; and a receiver 10 receives said transmission pulses from the output 2B of the line fiber; the receiver processes the time intervals between the pulses to restore said data that was to be transmitted 12.

In accordance with the present invention, the compensation means for compensating the time jitter include a compensation member 14 transmitting said transmission pulses between said output 2B of the line fiber and said receiver 10, and the compensation member presents negative overall chromatic dispersion that corrects said time jitter in part.

An amount of compensation TC is defined such that the absolute value of the negative overall chromatic dispersion is equal to the product of the amount of compensation multiplied by the positive overall chromatic dispersion imparted by the line fiber 2. Preferably, the amount of compensation TC lies in the range 1% to 50%, and preferably it further lies in the range 2% to 20%.

More precisely, the reduction in the time jitter is at its maximum for an amount of compensation equal to 50%. However, since the compensation member cannot present the soliton effect, it causes the pulses to spread, and it therefore causes an increase in the errors resulting from interference between successive symbols. Therefore, there is an optimum value for the dispersion of the compensation member, which value substantially reduces the time jitter without excessively increasing the interference between symbols.

By way of example, consideration is given below to the case of a 9,000 km 5 Gb/s link obtained in known manner by transmitting solitons having half-height durations equal to 40 ps (i.e. ⅕ of the bit time). In the absence of any means for compensating the time jitter, optimum chromatic dispersion per unit length for the line fiber is positive and is equal to +0.7 ps/nm.km. Such a link presents an error rate of about $10^{-15}$. With a compensation member of the invention presenting negative overall chromatic dispersion equal to −1,620 ps/nm, i.e. an amount of compensation TC=18%, the optimum chromatic dispersion per unit length of the line fiber becomes 1 ps/nm.km and the error rate reaches $10^{-20}$ with an electrical filter (not shown) which is incorporated in the receiver 10, and which has a suitable passband, such as 3.2 GHz.

The compensation member may be constituted merely by a "compensation" optical fiber presenting negative chromatic dispersion per unit length, e.g. equal to −30 ps/nm.km. An optimum length for the fiber is then 54 km.

Figure 2:
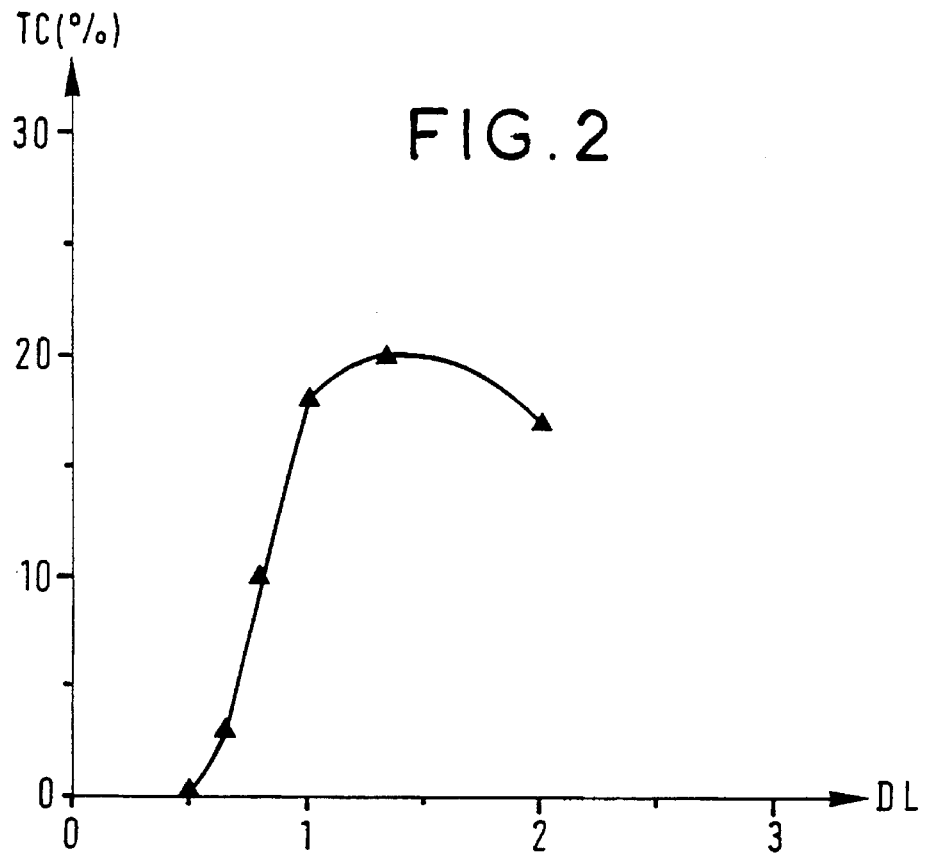
FIG. 2 is a graph showing how the optimum value of an amount of compensation, plotted up the y-axis, varies as a function of the chromatic dispersion per unit length of a line fiber, plotted along the x-axis.
Figure 3:
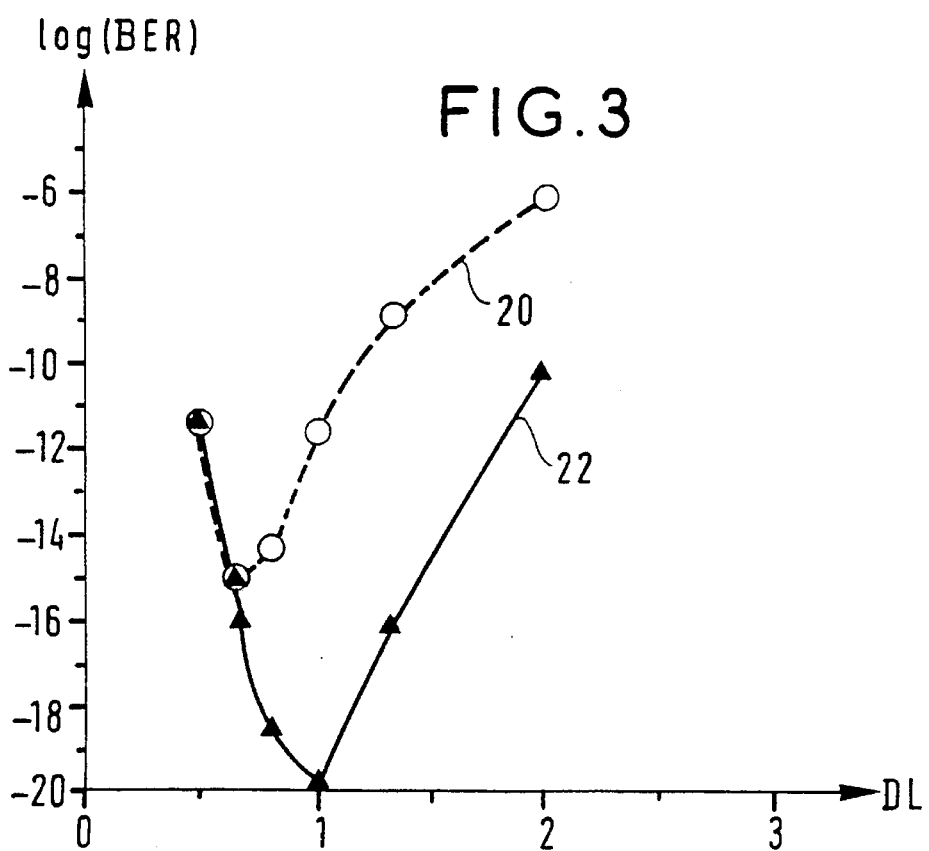
FIG. 3 gives two graphs showing how an error rate, plotted up the y-axis, varies as a function of the chromatic dispersion per unit length of a line fiber, plotted along the x-axis.

FIGS. 2 and 3 relate to the above-mentioned case, with the additional assumption that the amplifier means used are constituted by lumped optical amplifiers, such as amplifier 3, that are spaced 30 km apart from one another. The chromatic dispersions DL per unit length of the line fiber are expressed along the x-axes in ps/nm.km.

In FIG. 2, the amount of compensation is expressed in percentage.

In FIG. 3, the y-axis gives the logarithm of the error rate Log (BER). Graph 20 corresponds to the absence of any means for compensating the time jitter. Graph 22 corresponds to using an optimized compensation member of the invention.

We claim:

1. A soliton optical transmission system including:

a line fiber constituted by a very long optical fiber having an input and an output and presenting firstly a dispersive effect associated with positive chromatic dispersion per unit length, and secondly a Kerr effect, such that the dispersive effect and the Kerr effect compensate each other to retain the shape of a light pulse guided by the fiber when the pulse has intensity, duration, variation in shape, and spectrum width that are characteristic of a soliton of said fiber, the fiber applying gradual natural attenuation to the light pulses guided thereby, and being equipped with amplifier means, along the length of the fiber, for applying amplification to the pulses so as to compensate, at least in part, the natural attenuation noise from the amplifier means simultaneously applying interfering random spectral displacement to the pulses, which displacement in association with said dispersive effect of the line, causes a random time displacement constituting pulse time jitter;

a light source for supplying transmission pulses constituting said solitons of said fiber to said input of the line fiber on command;

a system input circuit receiving data to be transmitted and controlling said light source to make said light source supply a succession of said transmission pulses, in which succession the time intervals between the pulses are representative of said data to be transmitted;

compensation means for compensating said time jitter; and a receiver receiving said transmission pulses from said output of the line fiber, the receiver processing the time intervals between the pulses to restore said data to be transmitted;

wherein said compensation means include a compensation member transmitting said transmission pulses between said output of the line fiber and said receiver and presenting negative overall chromatic dispersion that corrects said time jitter in part, said compensation member spreading the shape of said transmission pulses so as to cause said transmission pulses not to have a soliton shape.

2. A system according to claim 1, wherein said compensation member presents negative overall chromatic dispersion whose absolute value is equal to the product of said positive chromatic dispersion per unit length of the line fiber multiplied by the length of the fiber and by an amount of compensation lying in the range 1% to 50%.

3. A system according to claim 2, wherein said amount of compensation lies in the range 2% to 20%.

4. A system according to claim 1, wherein said compensation member is constituted by a compensation optical fiber.

5. In an optical soliton transmission system comprising:

a source for supplying optical pulses which constitute soliton pulses carrying data to be transmitted and having a soliton shape and a soliton energy;

a line fiber for guiding said soliton pulses, said line fiber having a positive chromatic dispersion and a Kerr effect which compensates for said chromatic dispersion, said line fiber further having an attenuation and including a succession of mutually spaced repeaters each comprising an amplifier for compensating for said attenuation; and a receiver for receiving said optical pulses from said line fiber, wherein the improvement comprises negative chromatic dispersion means for decreasing an error rate of said system, said negative chromatic dispersion means being connected between said line fiber and said receiver and receiving said optical pulses with said soliton shape, said negative chromatic dispersion means causing said optical pulses to spread, such that said optical pulses do not have a soliton shape.

6. In an optical soliton transmission system comprising:

a source for supplying optical pulses carrying data to be transmitted and having a soliton shape;

a line fiber for guiding said optical pulses, said line fiber having a positive chromatic dispersion and a Kerr effect which compensates for said chromatic dispersion so as to maintain said soliton shape of said optical pulses at points along said line fiber where said optical pulses have a soliton power, whereby said optical pulses constitute soliton pulses, said line fiber further having an attenuation, said line fiber including amplifier means for guiding said optical pulses as said soliton pulses; and a receiver for receiving said optical pulses from said line fiber, the improvement comprising negative chromatic dispersion means connected between said line fiber and said receiver, for receiving said optical pulses with said soliton shape for spreading the shape of said optical pulses so as to cause said optical pulses no longer to have a soliton shape, and for supplying said optical pulses to said receiver with the spread shape.

* * * * *